United States Patent Office 3,215,838
Patented Nov. 2, 1965

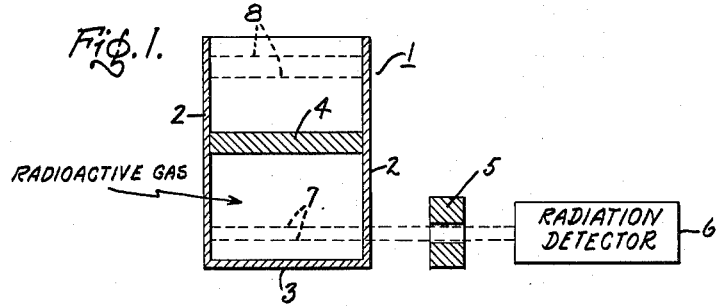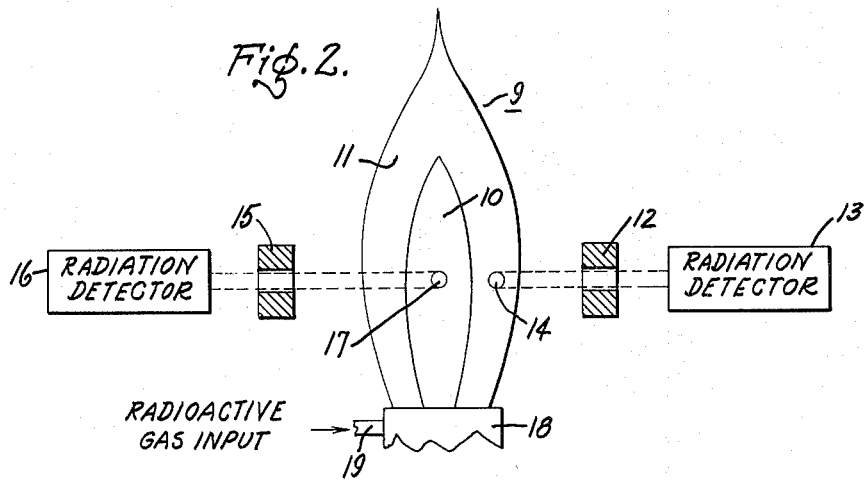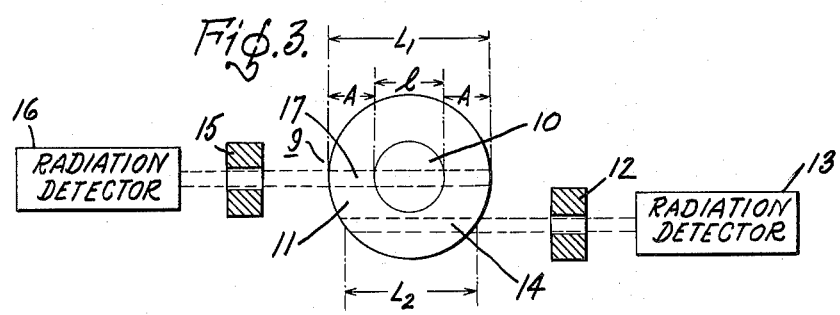

3,215,838
TEMPERATURE MEASUREMENT OF A FLAME INCLUDING INTRODUCING RADIOACTIVITY INTO A FLAME AND MEASURING THE RADIOACTIVITY THEREOF
Warner W. Schultz, Schenectady, N.Y., assignor to General Electric Company, a corporation of New York
Filed June 29, 1962, Ser. No. 206,470
2 Claims. (Cl. 250—83.3)

My invention relates to a method and apparatus for measuring the temperature within unconfined gases and, in particular, to a method and apparatus for measuring the temperature within the core of a flame by introducing radioactivity into the flame and measuring the radioactivity in selected regions thereof.

The measurement of temperature within unconfined gases such as flames, exhaust gas jets, and bodies of hot ionized gases called plasmas, which are often maintained at relatively constant pressure conditions, presents several problems. A first problem arises from the high temperatures which may be encountered, a temperature above 3000° F. being herein considered a high temperature. Thus, a conventional device for measuring temperature, the thermocouple, cannot be conveniently employed to measure the higher temperatures since the metals comprising the thermocouple would melt or even vaporize at such temperatures. The thermocouple method is further inconvenient in that physical contact must exist between the region whose temperature is being measured and the measuring device.

A method often employed to measure high temperatures is the sodium line reversal method, wherein a small amount of sodium is added to the flame whose temperature is to be measured. The sodium in the flame is assumed to be at the flame temperature and emits a bright line radiation at 0.589 micron. A spectroscope is employed to match the brightness from the sodium to the output of a lamp having known temperature versus brightness characteristics. Since the sodium line reversal method depends upon a matching of brightness from two sources, and optical line of sight must be maintained between the flame and spectroscope.

The requirement of an optical line of sight is a second problem encountered in the measurement of gases at both high or low temperatures and prevents obtaining temperature measurements within furnaces having no windows or within jet engine and rocket exhaust members, thus illustrating a limitation of the sodium line reversal method. A further limitation of this method is the need to employ experienced personnel to detect the brightness matching point, or in the alternative, employing an expensive apparatus to perform the matching automatically. Finally, the sodium line reversal method merely determines an average temperature of the total viewed volume, and thereby presents a third problem, the inability to distinguish and measure zones of different temperature within a body of gas. Since conventional temperature measuring techniques cannot be employed to measure high temperature of unconfined gases without employing an optical line of sight, and no known method exists for measuring different zones of temperature therein, a need exists for solving these problems by providing a new method and apparatus for measuring temperature.

Therefore, one of the principal objects of my invention is to develop a new and improved method and apparatus for measuring gas temperature at relatively constant pressure conditions.

Another important object of my invention is to develop a new and improved method and apparatus for measuring temperature at relatively constant pressure conditions wherein no physical contact exists between the region whose temperature is measured and the temperature indicating device.

Still another important object of my invention is to develop a new and improved method and apparatus for measuring temperature that utilizes the phenomenon of radioactivity.

A still further important object of my invention is to develop a new and improved method and apparatus for measuring different zones of temperature within a body of gas utilizing the phenomenon of radioactivity.

Briefly stated, and in accordance with one aspect of my invention in meeting the objects enumerated above, my method for measuring temperature consists in introducing radioactivity into a body of unconfined gas wherein the temperature of a particular portion is to be measured, as for example, the core of a flame, measuring the radiation sensed by viewing across the core of a flame and also by viewing across the flame at a point avoiding the core, and determining the radioactivity of the core alone as a function of the two measured radioactivities. The radioactivity of a given volume of the core is inversely proportional to the temperature of the core. The apparatus for measuring the temperature of the core of a flame consists of a means for introducing radioactivity into the flame, a first radiation detector with a radiation shield having an aperture therein and positioned between the detector and flame for viewing and measuring the radioactivity in the core portion of the flame, and a second radiation detector and radiation shield positioned between the flame and detector for viewing and measuring the radioactivity in a portion of the flame not including the core.

The feature of my invention which I desire to protect herein are pointed out with particularity in the appended claims. The invention itself, however, both as to its organization and method of operation, together with further objects and advantages thereof, may best be understood by reference to the following description taken in connection with the accompanying drawing, wherein like parts in each of the several figures are identified by the same reference character, and wherein:

FIGURE 1 is an elevation view, partly in section, illustrating the principle of Charles' Law whereby at constant pressure the volume of a given mass of gas varies directly as the absolute temperature;

FIGURE 2 is an elevation view, partly in section, illustrating the apparatus and portions of a flame in which the radioactivity is measured;

FIGURE 3 is a plan view, partly in section, illustrating the apparatus and portions of the flame shown in FIGURE 2.

A well known phenomenon in the field of physics is Charles' Law which states that at constant pressure the volume of a given mass of gas varies directly as the absolute temperature of the gas. Referring particularly to FIGURE 1, there is shown a container designated as a whole by numeral 1 having fixed sides 2, fixed bottom 3, and a top 4 which is movable in a vertical direction to maintain constant the pressure of a radioactive gas contained therein, the volume of the gas increasing as the temperature of the gas is increased. A radiation shield 5 forms a collimator which permits a radiation detector 6 to view only a very small volume of the radioactive gas as determined by the configuration and position of shield 5 relative to container 1 and detector 6. Thus, if collimator 5 has a cylindrical aperture therethrough, detector 6 will sense the radiation emitted only by a small cylindrical tubular volume of the radioactive gas indicated by the dash lines 7 within container 1. The counting rate that is measured by radiation detector 6 is proportional to the population density of the radioactive atoms in the volume of gas that detector 6 views through collimator 5. As the temperature of the confined gas is raised in some suitable manner, top 4 moves up to a new position designated by dashed lines 8, thus maintaining constant pressure of the gas within container 1. At the higher temperature, detector 6 still views the identical volume of gas as at the lower temperature, but the population density of radioactive atoms in this volume decreases thereby decreasing the counting rate measured by detector 6. Since the population density of atoms is inversely related to the volume of gas, then at constant pressure the specific counting rate is inversely proportional to the absolute temperature of the radioactive gas.

A device based on the behavior of a gas as demonstrated in FIGURE 1 may be used to measure the temperature of any gas maintained at relatively constant pressure conditions. It is not necessary that all of the atoms of the gas be radioactive, the only requirement being that there be enough radioactive gas to obtain a reasonable counting rate on the detector over the anticipated temperature range. The measurement is not affected by the degree of ionization of the gas or whether it is in the molecular or atomic form.

In realing with unconfined gases, as is often the case with flames, jets, and plasmas, the method of temperature measurement disclosed in FIGURE 1 can be applied since the pressures in these gases remain relatively constant. However, the temperature within the unconfined gases is not generally constant throughout the gas but varies at different regions in the gas. For example, a flame in general comprises a central region, called the core, which is at a higher temperature than the remaining portions of the flame. FIGURE 2 is an elevation view illustrating an unconfined gas in the form of a flame designated as a whole by numeral 9 and comprising a central core region 10 and an outer region 11. The assumption is made that at a particular instant of time and within a small volume of the flame as taken through a cross section thereof, the temperature throughout this small volume within region 11 is at a fixed value and the gas within region 10 is at another fixed temperature. The temperature within outer region 11 may easily be determined by orienting a radiation shield collimator 12 in a manner whereby a radation detector 13 senses the radiation emitting from flame region 11 alone in a manner similar to that shown in FIGURE 1. However, the temperature of the core 10 may not be determinedy by the relatively simple method employed to measure the temperature of outer region 11, since a collimator directed to view the core portion of the flame will enclose a tubular volume of gas which includes both the core portion 10 and outer portions 11. The temperature of the core may, however, be determined by the following method.

Referring to FIGURE 2 and FIGURE 3 which is a plan view of the flame and apparatus illustrated in FIGURE 2, a radiation shield collimator 12 is positioned to permit a first radiation detector 13 to view a tubular volume 14 along a length $L_2$ of the flame which avoids core portion 10. A second radiation shield collimator 15 is positioned to simultaneously permit a second radiation detector 16 to view a tubular volume 17 along a length $L_1$ which includes a section of central region 10 and outer regions 11. Radiation detectors 13 and 16 may comprise any of the conventional radiation measuring devices such as ionization chambers, scitillation counters, proportional counters, or Geiger counters, the particular device employed being dependent on the type of radioactivity being introduced into the flame. Radiation shield collimators 12 and 15 may be fabricated from lead or other metals. The specific counting rate (counts per unit length) over the length $L_2$ as determined by radiation detector 13 is assumed to equal the specific counting rate over lengths A as determined by radiation detector 16. This assumption may be written as an equation:

$$\frac{[c/m]L_2}{L_2} = \frac{[c/m]A}{A} \qquad (1)$$

where $$\frac{[c/m]L_2}{L_2}$$

is the specific counting rate over length $L_2$ and $$\frac{[c/m]A}{A}$$

is the specific counting rate over length A.

Since the counting rate over the length $L_1$ is composed of the contributions from the lengths A, 1 and A, this relation may be written as an equation:

$$\frac{[c/m]L_1}{L_1}L_1 = \frac{2[c/m]A}{A}A + \frac{[c/m]1}{1}1 \qquad (2)$$

Combining Equation 1 and 2 to eliminate the specific counting rate over the lengths A:

$$[c/m]1 = [c/m]L_1 - \frac{2A[c/m]L_2}{L_2} \qquad (3)$$

Dividing both sides of equation 3 by 1 obtains the specific counting rate of the core $$\frac{[c/m]1}{1}$$

in terms of measurable quantities, $[c/m]L_1$, the counting rate measured by detector 16 and $[c/m]L_2$, the counting rate measured by detector 13. The temperature of the core may then be calculated from the specific counting rate of the core. In the case of permanent installations, the radiation detector may be calibrated directly in degrees of temperature.

Several methods may be utilized to introduce the radioactivity into an unconfined gas. For example, a constant mass of radioactive gas having a suitable half-life and emitting radiation of suitable energy can be introduced into the flame by regulating the mass flow of radioactive gas at a point within the burner 18 by means of inlet 19 which is preferably radiation shielded. Radioactive gases such as krypton 85, radon, or thoron may conveniently be employed to produce the radioactivity in the flame. A few microcuries per cubic centimeter of flame may be continuously introduced without causing undue radiation hazards. Penetrating radiation such as gamma or X-ray is preferably used to permit positoning of the detector several feet from the gas which may be at a high temperature. In the case of burning substances, radioactive material may be combined with the fuel to thereby produce a radioactive gas in the burning process. In another method, activating particles such as neutrons, protons, or deuterons may be used to introduce the radioactivity by irradiating the flame, jet, or plasma. This latter method has the adavntage of utilizing relatively short half-life radiations, thus minimizing shielding requirements and the danger of radioactive contamination. In this irradiating method, preferably only the characteristic gamma radiation of the activated flame material is measured, thereby reducing background radiation effected by other radioactive particles. Pulse beam techniques, wherein an irradiating beam is applied in very short time intervals or pulses, may be employed to reduce the background radiation still further. In this pulse beam technique, the radiation detector is gated or controlled to measure radioactivity such as capture gamma rays only in the interval between the pulses of irradiating energy. Another method for measuring the characteristic gamma ray energies of the activated flame material in the presence of high background radiation is to use a pulse height analyzer to detect the particular gamma radiation. Still another method of introducing the radioactivity into the gas consists of irradiating the fuel which is burned to result in the flame, jet or plasma. Finally, the vapor of a radioactive metal may be used to introduce radioactivity into the gas provided the gas temperature is sufficiently high to maintain the metal in a vapor state.

From the foregoing description, it can be appreciated that my invention makes available a new method and apparatus for measuring the temperature of unconfined gases which are maintained at substantially constant pressure. Although a collimator having a small cylindrical aperture has been disclosed and is preferred for most applications, the aperture through the radiation shield may take other forms to produce noncylindrical collimations if the particular application so requires. Also, a single collimator and detector may be employed instead of two of each such devices provided the collimator and detector can be moved into their second respective positions within a very short time interval. I prefer to use two of each such devices when measuring a two-temperature zone gas to obtain simultaneous detector readings, thereby minimizing any transient effects in the gas. Further, the method disclosed for measuring temperatures in a body of gas having two regions maintained at different temperatures can be employed to measure a single temperature region by using only one collimator and detector and may be extended to three, four, or even more regions of different temperature merely by employing a greater number of collimators and radiation detectors.

Having described a new and improved method and apparatus for measuring high temperatures of unconfined gases by introducing radioactivity into the gas, it is believed obvious that modifications and variations of my invention are possible in light of the above teachings. It is, therefore, to be understood that changes may be made in the particular embodiment of my invention described which are within the full intended scope of the invention as defined by the following claims.

What I claim as new and desire to secure by Letters Patent of the United States is:

1. Apparatus for measuring the temperature within the core of a flame comprising,
   a source of radioactivity,
   means for introducing the radioactivity into a flame,
   a first radiation detector disposed at a predetermined distance from the flame,
   a first radiation shield positioned between the flame and said detector, said shield having a small aperture wherethrough said detector senses a first collimated beam of radiation from a region of the flame not including the core,
   a second radiation detector disposed at a predetermined distance from the flame, and
   a second radiation shield positioned between the flame and said second detector, said second shield having a small aperture wherethrough said second detector senses a second collimated beam of radiation from a region of the flame including the core, said two sensed radiations determining the radioactivity of the core alone, the radioactivity of the core being inversely proportional to temperature.

2. Apparatus for measuring the temperature within an unconfined body of gas having different temperature regions therein and comprising,
   a source of radioactivity,
   means for introducing the radioactivity into a body of unconfined gas,
   a plurality of radiation detectors, each detector disposed at a predetermined distance from the gas,
   a plurality of radiation shields, each radiation shield positioned respectively between the gas and one of said detectors, each shield having a small aperture wherethrough said detectors sense collimated beams of radiation emitting from selected volumes of the gas, said volumes of gas being selected in a manner to determine the radioactivity of each different temperature region whereby the temperature may be determined.

References Cited by the Examiner
UNITED STATES PATENTS

| | | | |
|---|---|---|---|
| 2,634,609 | 4/53 | Obermaier | 73—355 |
| 2,652,497 | 9/53 | Miller | 250—43.5 |

RALPH G. NILSON, *Primary Examiner.*

ARCHIE R. BORCHELT, *Examiner.*